United States Patent
Takakura et al.

(10) Patent No.: US 8,275,236 B2
(45) Date of Patent: Sep. 25, 2012

(54) INFORMATION-PROCESSING DEVICE, CONTENT-REPRODUCTION-PROPRIETY-DETERMINATION-NOTIFICATION METHOD, AND CONTENT-REPRODUCTION-PROPRIETY-DETERMINATION-NOTIFICATION PROGRAM

(75) Inventors: Hiroki Takakura, Tokyo (JP); Shiro Miyagi, Tokyo (JP)

(73) Assignee: Sony Corporation (JP)

( * ) Notice: Subject to any disclaimer, the term of this patent is extended or adjusted under 35 U.S.C. 154(b) by 1395 days.

(21) Appl. No.: 11/591,968

(22) Filed: Nov. 1, 2006

(65) Prior Publication Data

US 2007/0147779 A1   Jun. 28, 2007

(30) Foreign Application Priority Data

Dec. 27, 2005 (JP) ................ P2005-376515

(51) Int. Cl.
*H04N 9/80* (2006.01)
(52) U.S. Cl. ...................................... 386/239
(58) Field of Classification Search .......... 386/46, 386/95, 108, 120, 124–126, 132; 286/239, 286/353
See application file for complete search history.

(56) References Cited

U.S. PATENT DOCUMENTS

| | | | |
|---|---|---|---|
| 4,982,291 A * | 1/1991 | Kurahashi et al. | 386/225 |
| 6,741,965 B1 * | 5/2004 | Shimoyoshi et al. | 704/500 |
| 7,352,955 B2 * | 4/2008 | Kotani | 386/52 |
| 7,715,690 B1 * | 5/2010 | Nomura et al. | 386/95 |
| 7,814,291 B2 * | 10/2010 | Fontijn et al. | 711/173 |
| 2002/0194337 A1 * | 12/2002 | Knight et al. | 709/225 |
| 2004/0062530 A1 * | 4/2004 | Tsumagari et al. | 386/125 |
| 2004/0228621 A1 * | 11/2004 | Imoto | 386/125 |
| 2004/0264937 A1 * | 12/2004 | Takahashi et al. | 386/95 |
| 2006/0147183 A1 * | 7/2006 | Mae et al. | 386/95 |

FOREIGN PATENT DOCUMENTS

| JP | 2-170687 | * | 7/1990 |
|---|---|---|---|
| JP | 2004-104288 A | | 4/2004 |

* cited by examiner

*Primary Examiner* — David Harvey
(74) *Attorney, Agent, or Firm* — Lerner, David, Littenberg, Krumholz & Mentlik, LLP (57) ABSTRACT

An information-processing device including a recording unit configured to record a plurality of types of content-data items to be recorded onto at least one predetermined recording medium, a determination unit configured to determine whether or not the plurality of types of content-data items recorded onto the recording medium by the recording unit includes at least one content-data item of which reproduction is difficult for a purpose-built reproduction device to perform, the purpose-built reproduction device supporting a predetermined format, and a notification unit configured to make a notification according to a predetermined method when the determination unit determines that the content-data item of which reproduction is difficult to perform is included, the notification indicating details on the determination is provided.

12 Claims, 7 Drawing Sheets

DSG1  DSG2  DSG3

THIS DISK INCLUDES STILL-IMAGE CONTENTS WHICH CAN BE REPRODUCED BY PC

CMT

INFORMATION-PROCESSING DEVICE, CONTENT-REPRODUCTION-PROPRIETY-DETERMINATION-NOTIFICATION METHOD, AND CONTENT-REPRODUCTION-PROPRIETY-DETERMINATION-NOTIFICATION PROGRAM

CROSS REFERENCES TO RELATED APPLICATIONS

The present invention contains subject matter related to Japanese Patent Application JP 2005-376515 filed in the Japanese Patent Office on Dec. 27, 2005, the entire contents of which are incorporated herein by reference.

BACKGROUND OF THE INVENTION

1. Field of the Invention

The present invention relates to an information-processing device, a content-reproduction-propriety-determination-notification method, and a content-reproduction-propriety-determination-notification program that can be used for a personal computer (PC) configured to capture a video file including data on video picked up by a video camera and/or a still-image file including data on a still image picked up by the video camera and record the video data and/or the still-image data onto a digital versatile disk (DVD), for example.

2. Description of the Related Art

Hitherto, digital video cameras that have become abruptly and widely available are configured to record digital-image data onto various types of recording mediums including a video tape, the DVD, a memory card, a hard disk, and so forth. Here, the digital-image data is generated by subjecting an analog-image signal to analog-to-digital conversion processing, format-conversion processing, and so forth, where the analog-image signal is obtained by picking up the image of a subject through an image-pickup element such as a charge-coupled-device (CCD) sensor.

A user of the digital-video camera transfers the image data obtained by the digital-video camera to the PC so that the PC processes, corrects, and/or prints the image data, for example. However, since the amount of the image data (especially the amount of video-file data) is significantly large, it is not economical to record the image data onto a hard disk provided in the PC.

In general, therefore, the data included in the video file is independently recorded and held in a disk for reproduction in place of the hard disk provided in the PC via a disk-drive device, where the disk for reproduction may be a digital versatile disk-recordable (DVD-R), for example. The above-described technology is disclosed in Japanese Unexamined Patent Application Publication No. 2004-104288, for example. The DVD-Video format or the like is available, as a format used for recording the video-file data onto the above-described disk for reproduction, and a method of recording the video-file data by the Moving Picture Experts Group (MPEG) standards, for example, is provided.

SUMMARY OF THE INVENTION

Thus, the above-described PC records and holds the data included in the video file obtained by the digital-video camera onto the DVD-R in the DVD-Video format. However, the DVD-Video format is provided, mainly for reproducing video. Therefore, when the PC holds still-image-file data, it is difficult for an ordinary DVD player or the like other than the PC to reproduce the still-image-file data.

The PC performs slide show-conversion processing for the still-image-file data by the MPEG standards, so as to reproduce the still-image-file data in the slide-show form so that the still-image-file data can be reproduced by the ordinary DVD player or the like. However, since a small number of pixels are used for the still-image-file data subjected to the slide show-conversion processing by the MPEG standards, it is difficult to attain the original image quality of the still-image-file data.

Particularly when a plurality of types of content-data items including the video-file data and/or the still-image-file data is held in the digital-video camera and the PC generates a plurality of the DVD-Rs at one time by capturing and recording the entire video-file data and/or the still-image-file data, it is difficult for the user to determine which of the DVD-Rs includes the still-image-file data of which reproduction is difficult for the ordinary player after the plurality of DVD-Rs is generated.

In that case, even though one of the above-described DVD-Rs includes the still-image-file data of which reproduction is difficult for the ordinary player other than the video-file data which can be reproduced by the ordinary DVD player, it is difficult for the user to know the existence of the still-image-file data.

Accordingly, it is desirable to propose an information-processing device, a content-reproduction-propriety-determination-notification method, and a content-reproduction-propriety-determination-notification program so that when a predetermined type of content-data item of which reproduction is difficult for a purpose-built reproducing device supporting a predetermined format is recorded onto a recording medium, the user is notified that the above-described content-data item is recorded onto the recording medium with facility and reliability.

According to an embodiment of the present invention, a plurality of types of content-data items to be recorded is recorded onto at least one predetermined recording medium by a recording unit and it is determined whether or not the plurality of types of content-data items recorded onto the recording medium by the recording unit includes at least one content-data item of which reproduction is difficult for a purpose-built reproduction device to perform, the purpose-built reproduction device supporting a predetermined format. As a result, when it is determined that the content-data item of which reproduction is difficult to perform is included, a notification indicating details on the determination is made according to a predetermined method. Subsequently, when the content-data item of which reproduction is difficult for the purpose-built reproducing device to perform, the reproducing device supporting the predetermined format, is recorded onto the recording medium, the user is notified that the above-described content-data item is recorded onto the recording medium with reliability so that the user can identify the existence of the content-data item with facility and stability.

According to another embodiment of the present invention, a series of image-content data items including video data and/or still-image data are recorded onto at least one predetermined removable recording medium, and it is determined whether or not the series of image-content data items recorded onto the at least one recording medium includes the still-image data. When it is determined that the still-image data is included in the series of image-content data items, a notification indicating the number of the at least one recording medium onto which the series of image-content data items are recorded and the location of the at least one recording medium onto which the still-image data is recorded is made. Subsequently, when the image-content data items are recorded onto a plurality of the recording mediums, the user can be notified of the number of the recording mediums and a specific recording medium of the recording mediums with facility and stability, where the still-image data is recorded onto the specific recording medium.

According to an embodiment of the present invention, there are provided an information-processing device, a content-reproduction-propriety-determination-notification method, and a content-reproduction-propriety-determination-notification program so that when the content-data item of which reproduction is difficult for the purpose-built reproducing device supporting the predetermined format is recorded onto the recording medium, the user is notified that the above-described content-data item is recorded onto the recording medium with reliability and the user can identify the existence of the content-data item with facility. Thus, when the content-data item of which reproduction is difficult for the purpose-built reproducing device supporting the predetermined format is recorded onto the recording medium, the user is notified that the above-described content-data item is recorded onto the recording medium with facility and reliability.

Further, according to an embodiment of the present invention, there are provided an information-processing device, a content-determination-notification method, and a content-determination-notification program so that the series of image-content data items including the video data and/or the still-image data are recorded onto the at least one predetermined removable recording medium and it is determined whether or not the series of image-content data items recorded onto the at least one recording medium includes the still-image data. When it is determined that the still-image data is included in the series of the image-content data items, the notification indicating the number of the at least one recording medium onto which the series of image-content data items are recorded and the location of the at least one recording medium onto which the still-image data is recorded is made. Subsequently, when the image-content data items are recorded onto the plurality of the recording mediums, the user can be notified of the number of the recording mediums and the specific recording medium of the recording mediums with facility and stability, where the still-image data is recorded onto the specific recording medium. Thus, it becomes possible to notify the user of the number of the at least one recording medium onto which the image-content data items are recorded and the location of the at least one recording medium onto which the still-image data is recorded with facility and stability.

DESCRIPTION OF THE PREFERRED EMBODIMENTS

Hereinafter, an embodiment of the present invention will be described with reference to the attached drawings.

(1) Configuration of the Entire Disk-for-reproduction-generation System

Figure 1:
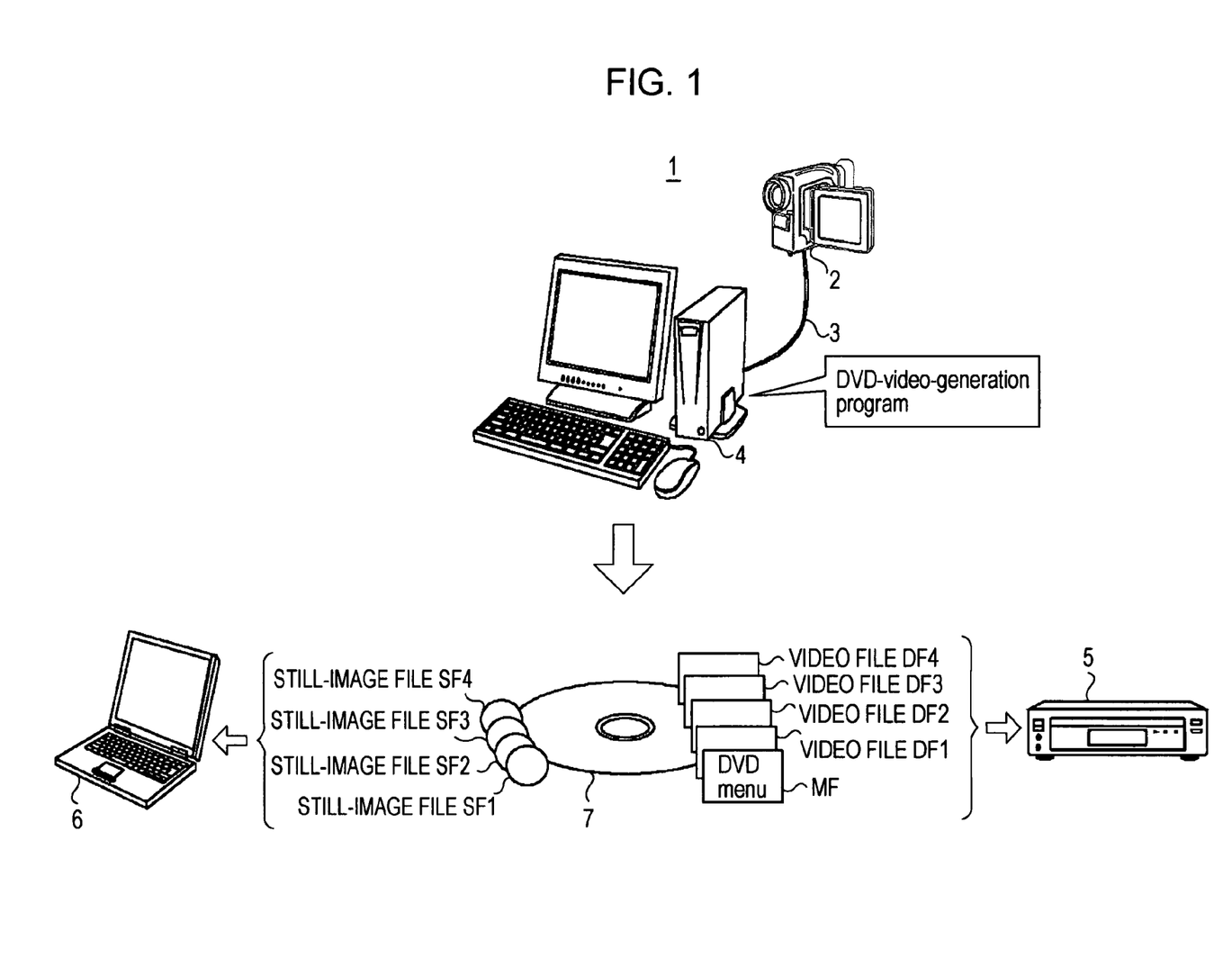
FIG. 1 is a schematic diagram showing a configuration of the entire disk-for-reproduction-generation system.

FIG. 1 shows the entire disk-for-reproduction-generation system 1 having a hard-disk-drive (HDD)-video camera 2 including a hard-disk drive storing files DF1, DF2, DF3, and DF4 including data on picked-up video, and files SF1, SF2, SF3, and SF4 including data on picked-up still images. The disk-for-reproduction generation system 1 further has a personal computer 4 connected to the HDD-video camera 2 via a communication interface such as a universal-serial-bus (USB) cable 3.

In the disk-for-reproduction generation system 1, the HDD-video camera 2 and the personal computer 4 are wired and connected to each other by the communication interface such as the USB cable 3 or the like. However, without being limited to the above-described configuration, the HDD-video camera 2 and the personal computer 4 may be wirelessly connected to each other via a radio-communication interface including "BLUETOOTH MODULE (Registered Trademark)", an Institute-of-Electrical-and-Electronics-Engineers (IEEE) 802.11g, and so forth.

When the HDD-video camera 2 is connected to the personal computer 4 via the USB cable 3, the HDD-video camera 2 transfers the video files DF1 to DF4 including the data on the video picked-up by the HDD-video camera 2 and the still-image files SF1 to SF4 including the data on the still images picked-up by the HDD-video camera 2 to the personal computer 4.

The personal computer 4 captures the video files DF1 to DF4 and the still-image files SF1 to SF4 that are transferred from the HDD-video camera 2 in sequence. Further, at the same time, the personal computer 4 records the video files DF1 to DF4 onto a digital versatile disk recordable (DVD-R) in DVD-Video format according to a DVD-video-generation program and records the still-image files SF1 to SF4 onto the DVD-R in Joint Photographic Experts Group (JPEG) format, so that a disk-for-reproduction 7 is generated.

In that case, the personal computer 4 generates the DVD-menu file MF corresponding to a plurality of types of the video files DF1 to DF4 according to the DVD-video-generation program and records the DVD-menu file MF onto the disk-for-reproduction 7.

As a result, the disk-for-reproduction 7 stores a series of image-content-data items including the plurality of types of the video files DF1 to DF4, a plurality of types of the still-image files SF1 to SF4, and the DVD-menu file MF.

When data recorded onto the disk-for-reproduction 7 is reproduced by using an ordinary DVD player 5, the data included in the video files DF1 to DF4 can be reproduced, since the data is recorded in the DVD-video format, which is used mainly for reproducing video data. However, it is difficult for the ordinary DVD player 5 to reproduce the data included in the still-image files SF1 to SF4, since the data is not recorded in the DVD-Video format.

However, even though it is difficult for the ordinary DVD player 5 to reproduce the data included in the still-image files SF1 to SF4, a notebook personal computer (hereinafter referred to as a notebook PC) 6 and the PC 4 can reproduce the above-described data included in the still-image files SF1 to SF4 according to a predetermined application program.

Therefore, when reproducing data included in the disk-for-reproduction 7 storing the video files DF1 to DF4 and the still-image files SF1 to SF4, the DVD player 5 notifies the user that the disk-for-reproduction 7 stores the still-image files SF1 to SF4 including data of which reproduction is difficult for the DVD player 5 according to a predetermined method and suggests the user reproduce the data included in the still-image files SF1 to SF5 by using the notebook PC 6 and/or the PC 4, for example.

Further, after generating the disk-for-reproduction 7 by recording the video files DF1 to DF4, the still-image files SF1 to SF4, and the DVD-menu file MF that are captured from the HDD-video camera 2 in sequence, the PC 4 notifies the user that the disk-for-reproduction 7 includes the still-image files SF1 to SF4 including data of which reproduction is difficult for the ordinary player 5 according to a predetermined method.

(2) The Circuit Configuration of HDD-video Camera

Figure 2:
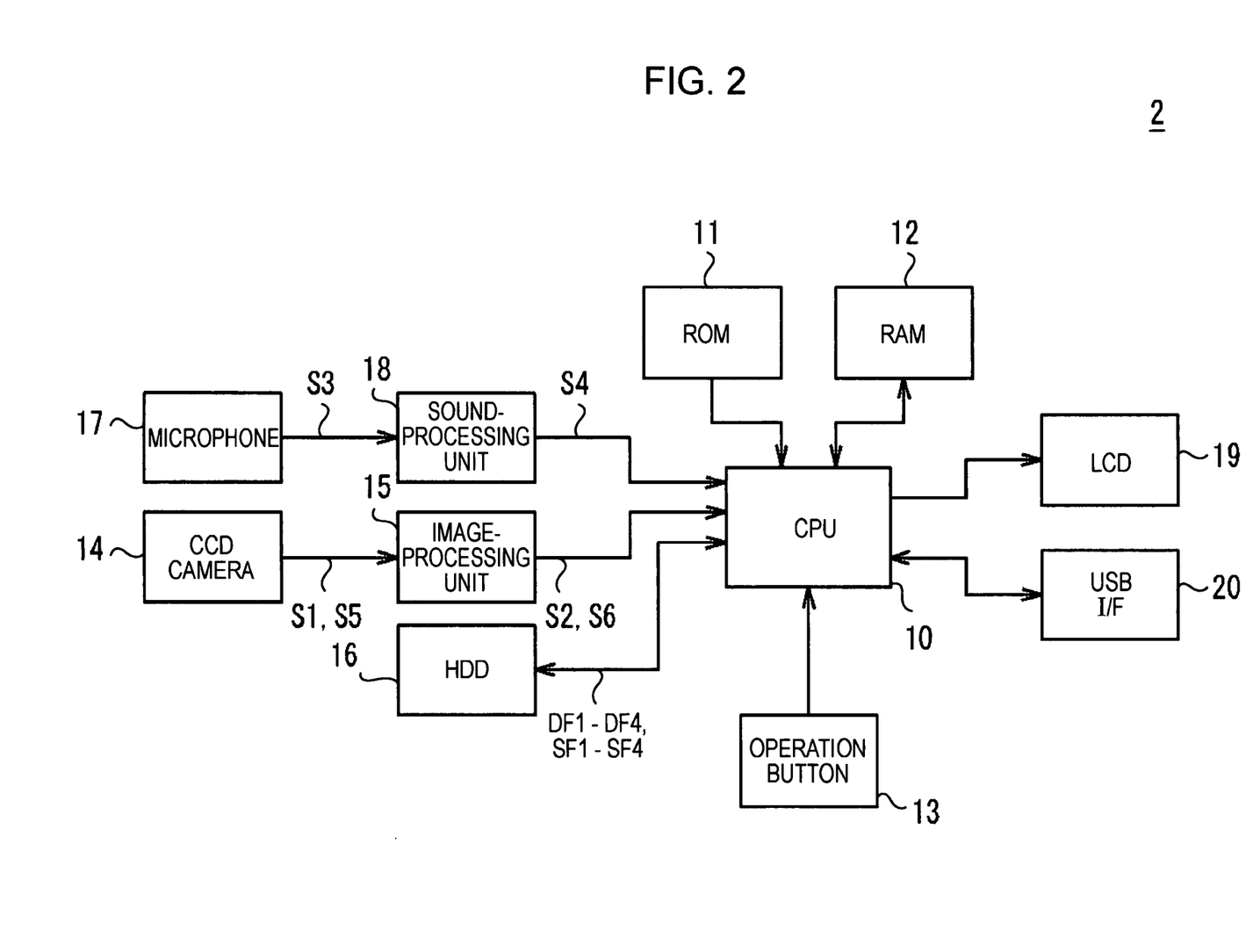
FIG. 2 is a schematic block diagram showing a circuit configuration of an HDD-video camera.

As shown in FIG. 2, the HDD-video camera 2 operates by using power transmitted from a battery (not shown). Subsequently, a central processing unit (CPU) 10 expands a basic program, various types of application programs, and so forth that are read from a read-only memory (ROM) 11 onto a random-access memory (RAM) 12, so as to control the entire HDD-video camera 2, and general photographing processing, reproduction processing, editing processing, and so forth can be performed when at least one of a group of operation buttons 13 is pressed down by the user.

Actually, when photographing a subject determined by the user according to the press-down operation performed for at least one of the group of operation buttons 13, the CPU 10 of the HDD-video camera 2 performs predetermined image processing for video data S1 picked up by a charge-coupled-device (CCD) camera 14 by using a image-processing unit 15 so that the video data S1 is converted into video data S2.

At the same time, the CPU 10 performs predetermined sound processing for sound data S3 collected by a microphone 17 by using a sound-processing unit 18 so that the sound data S3 is converted into sound data S4.

Then, the CPU 10 generates the video files DF1 to DF4 including the video data S2 and the sound data S4 that are synchronized with each other, and stores the generated video files DF1 to DF4 in a hard-disk drive 16.

When still-image data S5 is picked up by the CCD camera 14, the CPU 10 performs predetermined image processing for the still-image data S5 by using the image-processing unit 15 so that the still-image data S5 is converted into still-image data S6, and stores the still-image data S6 in the hard-disk drive 16, as the still-image file SF1. When the CPU 10 generates the still-image files SF2 to SF4 in the above-described manner, the CPU 10 also stores the still-image files SF2 to SF4 in the hard-disk drive 16.

Further, the CPU 10 can reproduce data included in at least one of the video files DF1 to DF4 and/or the still-image files SF1 to SF4 from the hard-disk drive 16 at the user's desire, and display video included in at least one of the video files DF1 to DF4 and/or a still image included in at least one of the still-image files SF1 to SF4 on a liquid-crystal display (LCD) 19 according to the press-down operation performed by the user for at least one of the group of operation buttons 13.

Further, the CPU 10 is USB-connected to the PC 4 via a USB interface (IF) 20 and a USB cable 3. Subsequently, CPU 10 can transfer the video files DF1 to DF4 and the still-image files SF1 to SF4 to the PC 4 in sequence so that the video files DF1 to DF4 and the still-image files SF1 to SF4 are copied to the PC 4, and/or the video files DF1 to DF4 and the still-image files SF1 to SF4 are recorded onto the disk-for-reproduction 7 which is removable via the PC 4. Here, the disk-for-reproduction 7 may not be the DVD-R, but may be a compact disk-recordable (CD-R), a flash memory, and so forth.

(3) The Circuit Configuration of Personal Computer

Figure 3:
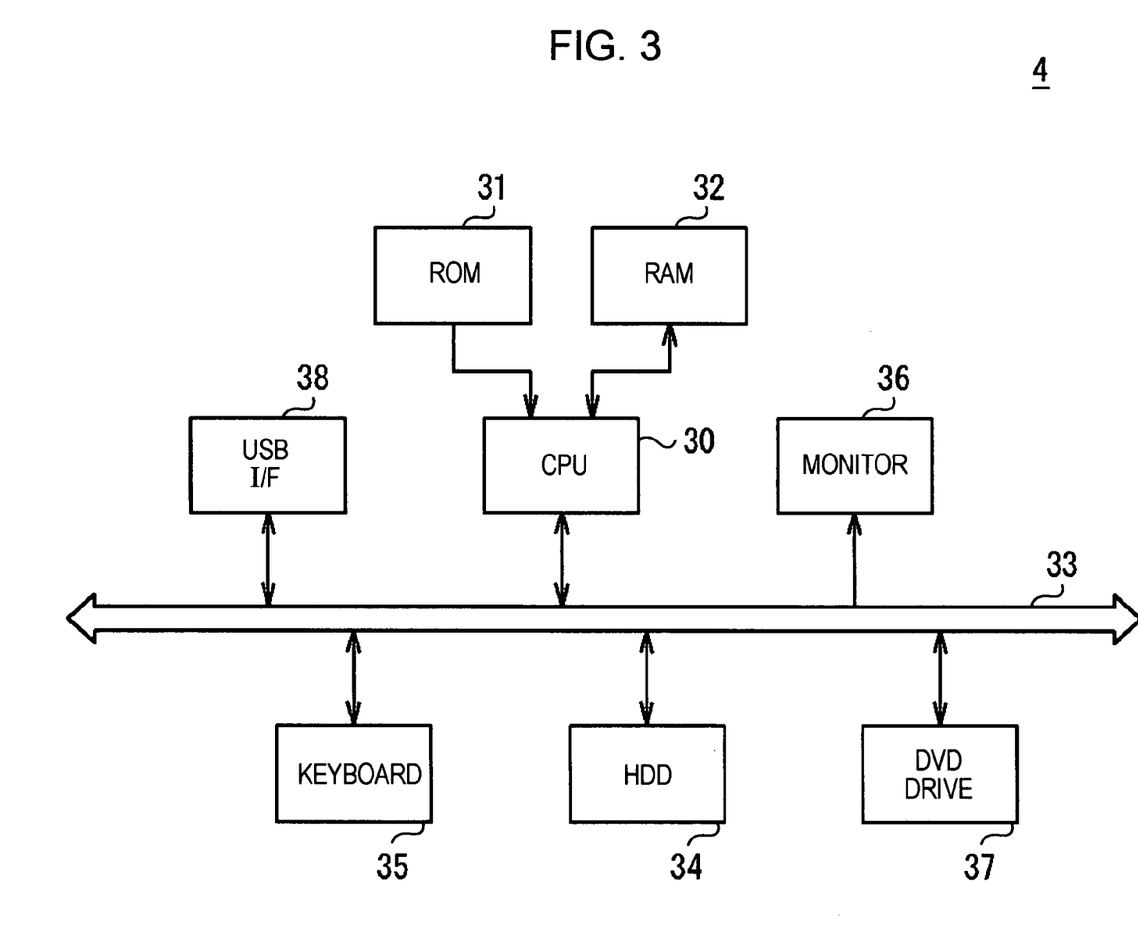
FIG. 3 is a schematic block diagram showing a circuit configuration of a personal computer.

In the PC 4, as shown in FIG. 3, a CPU 30 controls the entire PC 4 by expanding a basic program, various types of application programs, and so forth that are read from a ROM 31 and/or a hard-disk drive 34 onto a RAM 32 so that various types of processing procedures can be performed according to input operations performed by the user for a keyboard 35 or the like and information about the processing result can be displayed on a monitor 36 connected to the CPU 30 via a bus 33.

Further, the PC 4 has a DVD drive 37 so that the PC 4 can reproduce data recorded onto the disk-for-reproduction 7 loaded into the DVD drive 37, display information about the reproduction result on the monitor 36, write the video files DF1 to DF4 and the still-image files SF1 to SF4 that are captured from the HDD-video camera 2 in sequence in the hard-disk drive 34, where the HDD-video camera 2 is connected to the PC 4 via a USB interface 38 and the USB cable 3, and record the video files DF1 to DF4 and the still-image files SF1 to SF4 onto the disk-for-reproduction 7 by using the DVD drive 37 according to the DVD-generation program.

(4) The File-system Configuration of DVD-video Format

Figure 4:
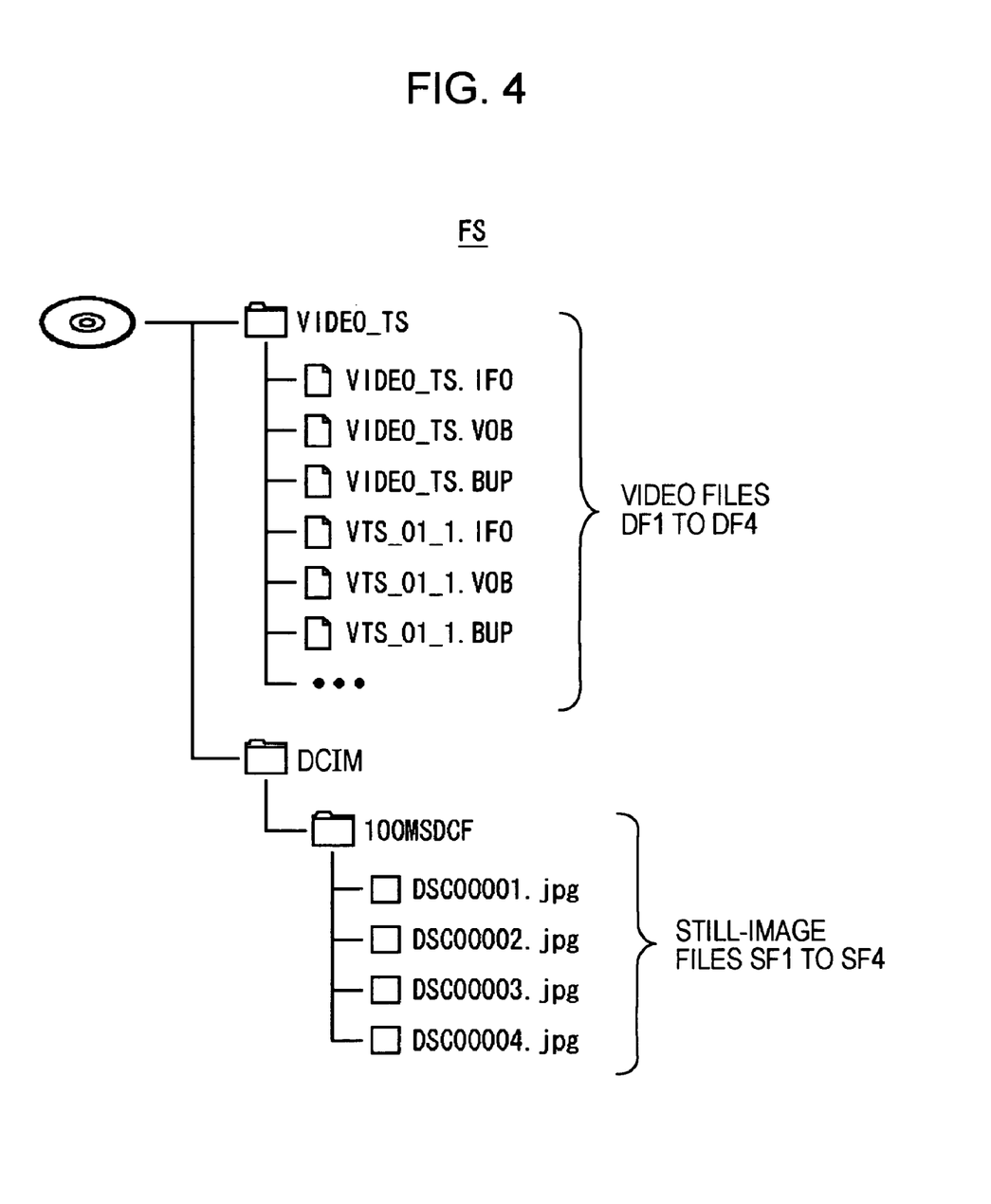
FIG. 4 is a schematic diagram showing a file-system configuration of a disk for reproduction.

Next, FIG. 4 illustrates a file system FS of the video files DF1 to DF4 and the still-image files SF1 to SF4 that are stored in the disk-for-reproduction disk 7.

The above-described file system FS is generated according to an operating system (OS) of the PC 4 so that management of a hierarchical file system having a directory-tree configuration is achieved.

In the above-described file system FS, the video files DF1 to DF4 are stored in a folder "VIDEO_TS". For example, a file "VIDEO_TS.IFO", a file "VIDEO_TS.VOB", a file "VIDEO_TS.BUP", a file "VIDEO_01_1.IFO", a file "VIDEO_01_1.VOB", and so forth are provided at a hierarchical level lower than that of the folder "VIDEO_TS". For example, the video file DF1 includes the file "VIDEO_01_1.IFO", the file "VIDEO_01_1.VOB", and a file "VIDEO_01_1.BUP".

A file supplied with an extension ".IFO" stores menu information and/or information about the chapter management and regional codes. A file supplied with an extension "VOB" stores video data, and a file supplied with an extension ".BUP" stores backup information.

Further, in the file system FS, a folder "DCIM" is provided on the same hierarchical level as that on which the folder "VIDEO_TS" is provided. The files "DSC00001.jpg" to "DSC00004.jpg" corresponding to the still-image files SF1 to SF4 are stored in a folder "100MSDCF" provided on a hierarchical level lower than that on which the folder "DCIM" is provided.

Figure 5:
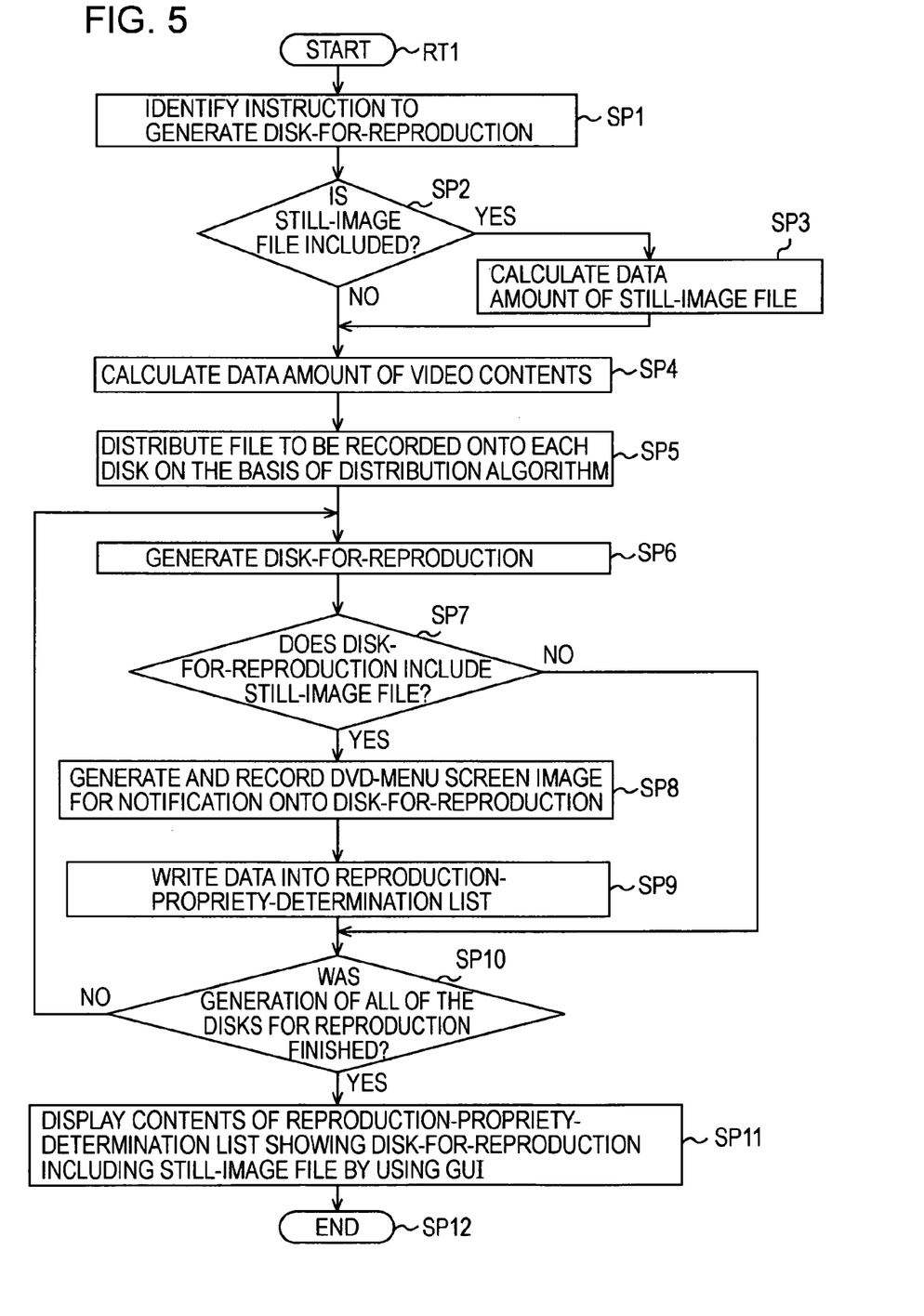
FIG. 5 is a flowchart showing content-reproduction-propriety-determination-notification processing procedures.

(5) Content-reproduction-propriety-determination-notification Processing Procedures In the disk-for-reproduction-generation system 1, the PC 4 captures a series of image-content-data items including the video files DF1 to DF4, the still-image files SF1 to SF4, and so forth that are transmitted from the HDD-video camera 2 in sequence and records the image-content-data items onto the DVD-R so that the disk-for-reproduction 7 is generated. However, if the disk-for-reproduction 7 includes the still-image files SF1 to SF4 including data of which reproduction is difficult for the ordinary DVD player 5, the user is notified that the disk-for-reproduction 7 includes the still-image files SF1 to SF4 according to a content-reproduction-propriety-determination-notification program. Hereinafter, content-reproduction-propriety-determination processing procedures performed, so as to make the above-described notification, will be described.

After starting a routine RT1, the CPU 30 of the PC 4 advances to step SP1, so as to identify an instruction to generate the disk-for-reproduction 7 when the generation instruction is transmitted in response to an input operation performed by the user. Then, the CPU 30 advances to step SP2.

At step SP2, the CPU 30 accesses the hard-disk drive 16 of the HDD-video camera 2 which is connected to the PC 4 via the USB cable 3 and determines whether or not the still-image files SF1 to SF4 are included in data stored in the hard-disk drive 16. When a negative result is obtained, at step SP2, the CPU 30 advances to step SP4. However, when a positive result is obtained, at step SP2, the CPU 30 advances to step SP3.

At step SP3, the CPU 30 calculates the data amount of the still-image files SF1 to SF4 stored in the hard-disk drive 16 of the HDD-video camera 2 and advances to step SP4.

At step SP4, the CPU 30 calculates the data amount of the video files DF1 to DF4 stored in the hard-disk drive 16 of the HDD-video camera 2 and advances to step SP5.

At step SP5, when the video files DF1 to DF4 and the still-image files SF1 to SF4 are stored in the hard-disk drive 16, the CPU 30 determines how the video files DF1 to DF4 and the still-image files SF1 to SF4 are to be distributed and recorded onto a plurality of DVD-Rs according to a predetermined distribution algorithm, and advances to step SP6.

When it is determined that the entire video files DF1 to DF4 and still-image files SF1 to SF4 can be recorded onto a single DVD-R on the basis of the data amount, the CPU 30 records the entire video files DF1 to DF4 and still-image files SF1 to SF4 onto the single DVD-R without making the above-described distribution determination so that the disk-for-reproduction 7 is generated.

At step SP5, when only the video files DF1 to DF4 are stored in the hard-disk drive 16, or only the still-image files SF1 to SF4 are stored in the hard-disk drive 16, the CPU 30 determines how the video files DF1 to DF4, or the still-image files SF1 to SF4 are to be distributed and recorded onto the plurality of DVD-Rs according to the predetermined distribution algorithm, and advances to step SP6.

At step SP6, the CPU 30 records the video files DF1 to DF4 and the still-image files SF1 to SF4 onto the DVD-Rs while capturing the video files DF1 to DF4 and the still-image files SF1 to SF4 that are transmitted from the HDD-video camera 2 in sequence so that a plurality of the disk-for-reproduction 7 are generated in sequence. Then, the CPU 30 advances to step SP7.

For recording the video files DF1 to DF4 and the still-image files SF1 to SF4 onto the DVD-Rs according to details on the distribution determination which is made, at step SP5, the CPU 30 records the video files DF1 to DF4 onto a few of the DVD-Rs in advance and records the still-image files SF1 to SF4 onto the rest of the DVD-Rs. Otherwise, the CPU 30 records the still-image files SF1 to SF4 onto the first DVD-R of the DVD-Rs and records the video files DF1 to DF4 onto the rest of the DVD-Rs, for example.

At step SP7, the CPU 30 determines whether or not the disk-for-reproduction 7 generated, at step SP6, includes the still-image files SF1 to SF4. When a positive result is obtained, at step SP7, the CPU 30 advances to step SP8. When a negative result is obtained, at step SP7, the CPU 30 advances to step SP10.

Figure 6:
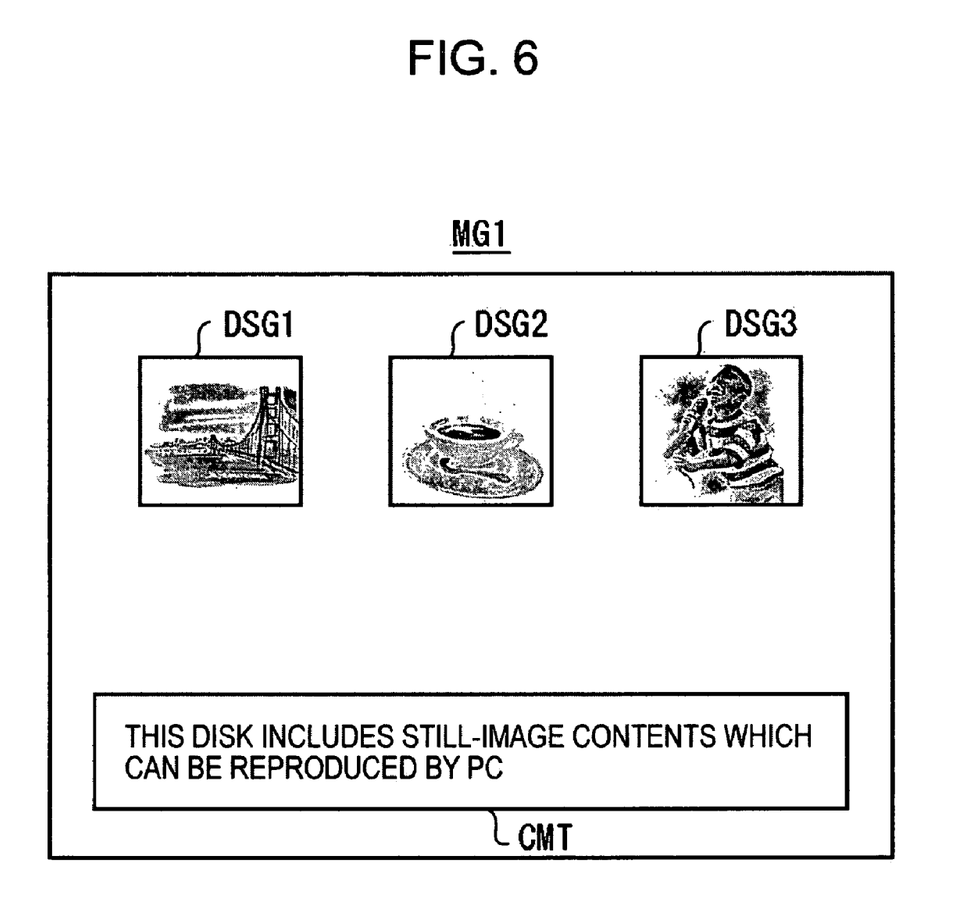
FIG. 6 is a schematic diagram showing a DVD-menu screen image according to an embodiment of the present invention.

At step SP8, the CPU 30 generates a DVD-menu-screen image MG1, so as to notify the user that the still-image files SF1 to SF4 are included in the disk-for-reproduction 7, as shown in FIG. 6. After that, the CPU 30 records data on the DVD-menu-screen image MG1 onto the disk-for-reproduction 7 and advances to step SP9.

When the above-described video files DF1 to DF3 and still-image files SF1 to SF4 are recorded onto the disk-for-reproduction 7, the thumbnails corresponding to the video files DF1 to DF3 are shown in the DVD-menu-screen image MG1. At the same time, a comment CMT which reads "THIS DISK INCLUDES STILL-IMAGE CONTENTS WHICH CAN BE REPRODUCED BY PC" is shown in the DVD-menu-screen image MG1, so as to notify the user that it is difficult for the DVD player 5 to reproduce the data included in the still-image files SF1 to SF4.

Subsequently, the DVD player 5 displays the DVD-menu-screen image MG1 before the disk-for-reproduction disk 7 is loaded and reproduction processing is started, so as to notify the user that the disk-for-reproduction 7 includes still-image contents of which reproduction is difficult for the DVD player 5 and that the still-image contents can be reproduced by the notebook PC 5, the PC 4, and so forth.

At step SP9, since the disk-for-reproduction 7 includes the still-image files SF1 to SF4 including data of which reproduction is difficult for the DVD player 5, the CPU 30 writes data on the disk-for-reproduction 7 on a reproduction-propriety-determination list (not shown), and advances to step SP10.

At step SP10, the CPU 30 determines whether recording data onto the plurality of DVD-Rs according to details on the distribution determination which was made, at step SP5, was finished and all of the disks-for-reproduction 7 were generated. When a negative result is obtained, at step SP10, the CPU 30 returns to step SP6 and performs the above-described processing until all of the disks-for-reproduction 7 are generated. On the other hand, when a positive result is obtained, at step SP10, the CPU 30 advances to step SP11.

Figure 7:
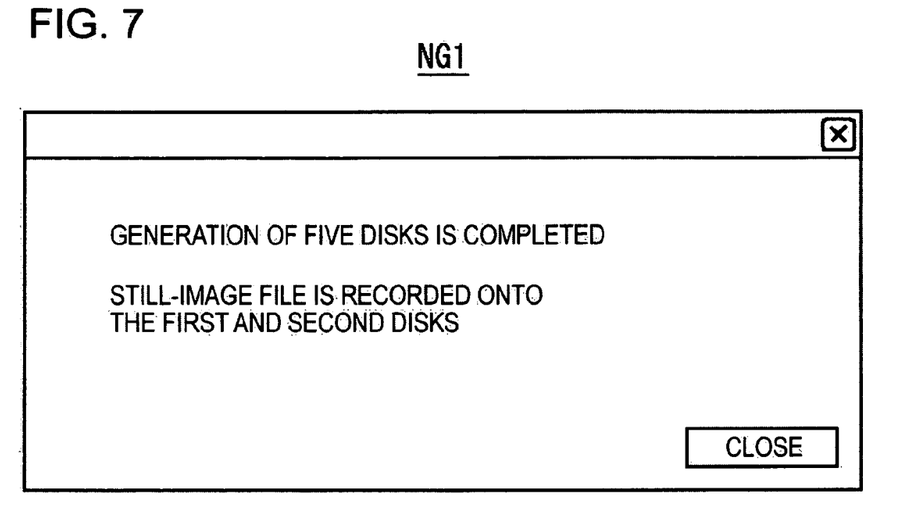
FIG. 7 is a schematic diagram showing a content-of-notification screen image of the disk for reproduction, where the disk includes still-image contents.

At step SP11, the CPU 30 displays a content-of-notification screen image NG1 on the monitor 36 by using a graphical-user interface (GUI), the content-of-notification screen image being generated on the basis of the details on the reproduction-propriety-determination list showing the data on the disk-for-reproduction 7 including the still-image files SF1 to SF4, as shown in FIG. 7, since the generation of all of the disks-for-reproduction 7 was finished. Then, the CPU 30 advances to step SP12 and finishes the processing procedures.

The content-of-notification screen image NG1 shows the total number of the disks-for-reproduction 7 (five in the above-described embodiment), as a character-display image. Further, the content-of-notification screen image NG1 shows that the still-image files SF are recorded onto the first and second disks-for-reproduction 7, as a character-display image showing the locations of the disks-for-reproduction 7 including the still-image files SF. Subsequently, the user can understand which of the disks-for-reproduction 7 includes the still-image file SF with stability immediately after the disks-for-reproduction 7 are generated.

(6) Operations and Advantages

Accordingly, the PC 4 of the disk-for-reproduction-generation system 1 captures the video files DF1 to DF4 and the still-image files SF1 to SF4 that are transmitted from the HDD-video camera 2 connected to the PC 4 via the USB cable 3 in sequence and records the video files DF1 to DF4 and the still-image files SF1 to SF4 onto the DVD-Rs so that the disks-for-reproduction 7 are generated. Then, the PC 4 can notify the user of the existence of each of the disks-forreproduction 7 including the still-image files SF1 to SF4 by using the content-of-notification screen image NG1 shown in FIG. 7.

Subsequently, the user of the PC 4 can understand which of the disks-for-reproduction 7 includes the still-image contents immediately after the disks-for-reproduction 7 are generated. Therefore, the user can avoid selecting the ordinary DVD player 5, as a reproduction device, so as to see the data included in the still-image files SF1 to SF4, even though the DVD player 5 can only reproduce video contents.

Further, when the disk-for-reproduction 7 includes the still-image files SF1 to SF4, the CPU 30 can generate the DVD-menu screen image MG1 generated, so as to inform the user that the disk-for-reproduction 7 includes the still-image files SF1 to SF4, and record the data on the DVD-menu screen image MG1 onto the disk-for-reproduction 7.

Subsequently, a user other than the owner of the PC 4 can visually identify the comment CMT shown in the DVD-menu screen image MG1 shown in FIG. 6 when the data recorded onto the disk-for-reproduction 7 is reproduced by the DVD player 5. Therefore, the user can identify that still-image contents are included in the disk-for-reproduction 7 and that the still-image contents can be reproduced and seen by using the PC 4 and/or the notebook PC 6.

Accordingly, the PC4 of the disk-for-reproduction-generation system 1 can generate the disk-for-reproduction 7 by recording the video files DF1 to DF4 and the still-image files SF1 to SF4 onto the DVD-R. At the same time, the PC 4 can inform the owner of the PC 4 and/or the user other than the owner, the user using the disk-for-reproduction 7 through the DVD player 5, that the still-image contents are included in the disk-for-reproduction 7 with stability. Further, the PC 4 can make the owner and/or the user understand the method of seeing the still-image contents.

(7) Other Embodiments

According to the above-described embodiment, the user is visibly notified of the existence of the disk-for-reproduction 7 including the still-image files SF1 to SF4 by using the content-of-notification screen image NG1 shown in FIG. 7. However, without being limited to the above-described embodiment, the user may be informed of the existence of the disk-for-reproduction 7 including the still-image files SF1 to SF4 by sound.

Figure 8:
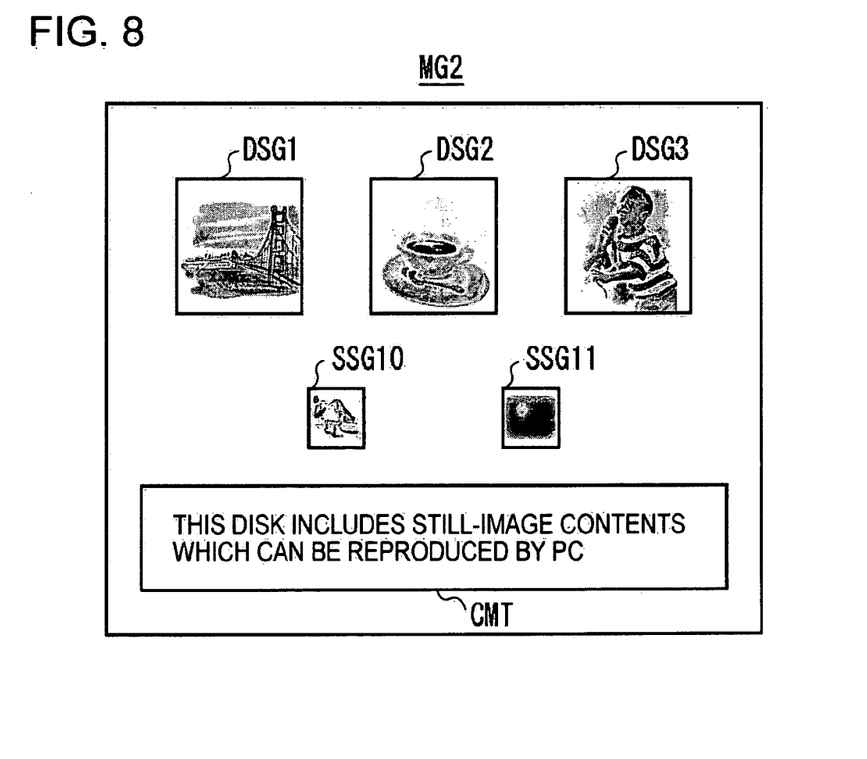
FIG. 8 is a schematic diagram showing a DVD-menu screen image according to another embodiment of the present invention.

Further, according to the above-described embodiment, the DVD-menu screen image MG1 shown in FIG. 6 is displayed, so as to notify the user of the existence of the disk-for-reproduction 7 including the still-image files SF1 to SF4. However, without being limited to the above-described embodiment, a DVD-menu screen image MG2 may be displayed, as shown in FIG. 8, so that the user is informed of the existence of the still-image files SF with stability through images of thumbnails SSG10 and SSG11, and the comment CMT.

Further, according to the above-described embodiment, the video files DF1 to DF4 are recorded in the DVD-Video format. However, without being limited to the above-described embodiment, the video files DF1 to DF4 may be recorded in an optical-disk format supporting a Blu-ray Disc, a recording-medium format supporting "MEMORY STICK (Registered Trademark of Sony Corporation)" or the like, and other various types of formats.

Further, according to the above-described embodiment, the video files DF1 to DF4 and the still-image files SF1 to SF4 are recorded onto the DVD-R functioning, as a recording medium, so that the disk-for-reproduction 7 is generated. However, without being limited to the above-described embodiment, various types of recording mediums other than the DVD may be used, as long as they are removable mediums. For example, the Blu-ray Disc, "MEMORY STICK (Registered Trademark of Sony Corporation)", the hard disk, and so forth may be used.

Further, according to the above-described embodiment, the above-described video files DF1 to DF4 and still-image files SF1 to SF4 obtained by the HDD-video camera 2 are transferred to the PC 4, and the PC 4 generates the disk-for-reproduction 7. However, without being limited to the above-described embodiment, the video files DF1 to DF4 and the still-image files SF1 to SF4 possessed by the PC 4 may be transferred to the HDD-video camera 2. Then, the HDD-video camera 2 may record the video files DF1 to DF4 and the still-image files SF1 to SF4 onto a removable recording medium including the DVD-R, a flash memory, and so forth. Further, data on a menu-screen image such as the DVD-menu-screen image 1 may be recorded onto the recording medium and the content-of-notification screen image NG1 may be displayed on the LCD 19.

Further, according to the above-described embodiment, the content-reproduction-propriety-determination-notification program is installed in advance. Namely, when the PC 4 generates the disk-for-reproduction 7 and when the disk-for-reproduction 7 includes the still-image files SF1 to SF4 including data of which reproduction is difficult for the DVD player 5, the content-reproduction-propriety-determination-notification program is used, so as to notify the user that the disk-for-reproduction 7 includes the still-image files SF1 to SF4. However, the content-reproduction-propriety-determination-notification program may be installed from a recording medium including a CD-ROM, the DVD, and so forth, or downloaded from a site running on the Internet for use, without being limited to the above-described embodiment.

Further, according to the above-described embodiment, at step SP1 of the content-reproduction-propriety-determination-notification processing procedures, the instruction to generate the disk-for-reproduction 7 is identified when the generation instruction is transmitted in response to the input operation performed by the user, and data is recorded onto the disk-for-reproduction 7. Without being limited to the above-described embodiment, the HDD-video camera 2 may generate and store predetermined function-identification file data in the hard-disk drive 16. Further, when the PC 4 connected to the HDD-video camera 2 via the USB cable 3 identifies the existence of the function-identification file data stored in the HDD-video camera 2, it may be determined that the instruction to generate the disk-for-reproduction 7 is generated, and the video files DF1 to DF4 and the still-image files SF1 to SF4 may be recorded onto the disk-for-reproduction 7.

Still further, according to the above-described embodiment, the CPU 30 of the PC 4 records the video files DF1 to DF4 and the still-image files SF1 to SF4 onto the disk-for-reproduction 7 by using the DVD drive 37 while capturing the video files DF1 to DF4 and the still-image files SF1 to SF4 that are transmitted from the HDD-video camera 2 in sequence. However, without being limited to the above-described embodiment, the CPU 30 may record the video files DF1 to DF4 and the still-image files SF1 to SF4 that had already been captured from the HDD-video camera 2 and held onto the disk-for-reproduction 7 by using the DVD drive 37. Otherwise, the CPU 30 may record the video files DF1 to DF4 and the still-image files SF1 to SF4 that are downloaded from a site running on the Internet onto the disk-for-reproduction 7 by using the DVD drive 37.

Further, according to the above-described embodiment, when the video files DF1 to DF4 and/or the still-image files SF1 to SF4 are recorded onto the plurality of DVD-Rs on the basis of details on the distribution determination made, at step SP5 included in the content-reproduction-propriety-determination-notification-processing procedures RT1, all of the video files DF1 to DF4 are recorded onto a few of the plurality of DVD-Rs at the outset and the still-image files SF1 to SF4 are recorded onto the rest of the plurality of DVD-Rs so that the disks-for-reproduction 7 are generated. Otherwise, the still-image files SF1 to SF4 are recorded onto the first DVD-R and the video files DF1 to DF4 are recorded onto the rest of the DVD-Rs so that the disks-for-reproduction 7 are generated. However, without being limited to the above-described embodiment, the still-image files SF1 to SF4 may be recorded onto the first, third, and tenth DVD-Rs and the video files DF1 to DF4 may be recorded onto the fourth to ninth DVD-Rs so that the disks-for-reproduction 7 are generated. Namely, the plurality of DVD-Rs may be used in arbitrary combination, so as to generate the disks-for-reproduction 7.

Further, according to the above-described embodiment, the PC 4 includes the DVD drive 37 functioning, as a recording unit, the CPU 30 functioning, as a determination unit, and the CPU 30 and the monitor 36 functioning, as notification units so that the PC 4 operates, as an information-processing device. However, without being limited to the above-described embodiment, an information-processing device according to another embodiment of the present invention may include a recording unit, a determination unit, and a notification unit that have various types of circuit configurations.

It should be understood by those skilled in the art that various modifications, combinations, sub-combinations and alterations may occur depending on design requirements and other factors insofar as they are within the scope of the appended claims or the equivalents thereof.

What is claimed is:

1. An information-processing device, comprising:
recording control means for controlling a recording means to record a plurality of types of content-data items to be recorded onto at least one predetermined recording medium in a first predetermined format;
determination means configured to determine whether or not the plurality of types of content-data items recorded onto the recording medium by the recording means includes at least one content-data item for which reproduction is inhibited for a reproduction device because the reproduction device supports a second predetermined format; and
notification means configured to make a notification according to a predetermined method when the determination means determines that the content-data item for which reproduction is inhibited is included, the notification indicating details on the determination,
wherein the recording control means controls the recording means to write information about a notification indicating that the content-data item for which reproduction is inhibited is included onto the recording medium when recording the content-data item for which reproduction is inhibited for the reproduction device onto the recording medium, and
when the plurality of types of content-data items are distributed and recorded onto a plurality of the recording mediums, the notification means makes a notification which allows for differentiating between the recording medium including the content-data item for which reproduction is inhibited for the reproduction device and the recording medium including the content-data item that can be reproduced by the reproduction device.

2. An information-processing device, comprising:
recording control means for controlling a recording means to record a plurality of types of content-data items to be recorded onto at least one predetermined recording medium in a first predetermined format;
determination means configured to determine whether or not the plurality of types of content-data items recorded onto the recording medium by the recording means includes at least one content-data item for which reproduction by a reproduction device is inhibited because the reproduction device supports a second predetermined format; and
notification means configured to make a notification according to a predetermined method when the determination means determines that the content-data item for which reproduction is inhibited is included, the notification indicating details on the determination,
wherein the recording control means controls the recording means to write information about a notification indicating that the content-data item for which reproduction is inhibited is included onto the recording medium when recording the content-data item for which reproduction is inhibited for the reproduction device onto the recording medium, and
after the plurality of types of content-data items are recorded onto the at least one recording medium, the notification means specifies the recording medium including the content-data item for which reproduction is inhibited for the reproduction device and displays information about the recording medium including the content-data item for which reproduction is inhibited for the reproduction device, as the predetermined method.

3. An information-processing device, comprising:
a recording device configured to record a series of image-content data items including video data and/or still-image data onto at least one predetermined removable recording medium;
determination means configured to determine whether or not the series of image-content data items recorded onto the at least one recording medium by the recording device includes the still-image data which includes data for which reproduction by a reproduction device is inhibited because that reproduction device does not support a format for such data; and
notification means configured to make a notification indicating a number of the at least one recording medium onto which the series of image-content data items are recorded and a location of the at least one recording medium onto which the still-image data is recorded when the determination means determines that the still-image data is included in the series of image-content data items.

4. A content-reproduction-propriety-determination-notification method, comprising:
using a processor to carry out the following:
recording a plurality of types of content-data items to be recorded onto at least one predetermined recording medium in a first predetermined format by using recording means,
making a reproduction-propriety-determination by determining whether or not the plurality of types of content-data items recorded onto the recording medium, at the recording step, includes at least one content-data item for which reproduction is inhibited for a reproduction device because the reproduction device supports a second predetermined format, and making a notification according to a predetermined method when it is determined that the content-data item for which reproduction is inhibited is included, at the reproduction-propriety-determination step, the notification indicating details on the determination, wherein at the recording step, information about a notification indicating that the content-data item for which reproduction is inhibited is written onto the recording medium when the content-data item for which reproduction is inhibited for the reproduction device is recorded onto the recording medium, and when the plurality of types of content-data items are distributed and recorded onto a plurality of the recording mediums, the notification step makes a notification which allows for differentiating between the recording medium including the content-data item for which reproduction is inhibited for the reproduction device and the recording medium including the content-data item that can be reproduced by the reproduction device.

5. A content-determination-notification method, comprising:

using a processor to carry out the following:

recording a series of image-content data items including video data and/or still-image data onto at least one predetermined removable recording medium, determining whether or not the series of image-content data items recorded onto the at least one recording medium, at the recording step, includes the still-image data which includes data which is inhibited for a reproduction device because that reproduction device does not support a format for such data, and making a notification indicating a number of the at least one recording medium onto which the series of image-content data items are recorded and a location of the at least one recording medium onto which the still-image data is recorded when it is determined that the still-image data is included in the series of image-content data items, at the determination step.

6. A processor encoded with instructions for carrying out a content-reproduction-propriety-determination-notification method, the method comprising:

recording a plurality of types of content-data items to be recorded onto at least one predetermined recording medium in a first predetermined format by using recording means;

making a reproduction-propriety determination by determining whether or not the plurality of types of content-data items recorded onto the recording medium, at the recording step, includes at least one content-data item for which reproduction is inhibited for a reproduction device because the reproduction device supports a second predetermined format; and making a notification according to a predetermined method when it is determined that the content-data item for which reproduction is inhibited is included, at the reproduction-propriety-determination step, the notification indicating details on the determination, wherein at the recording step, information about a notification indicating that the content-data item for which reproduction is inhibited is included is written onto the recording medium when the content-data item for which reproduction is inhibited for the reproduction device is recorded onto the recording medium, and when the plurality of types of content-data items are distributed and recorded onto a plurality of the recording mediums, the notification step makes a notification which allows for differentiating between the recording medium including the content-data item for which reproduction is inhibited for the reproduction device and the recording medium including the content-data item that can be reproduced by the reproduction device.

7. A processor encoded with instructions for carrying out a content-determination-notification method, the method comprising:

recording a series of image-content data items including video data and/or still-image data to be recorded onto at least one predetermined removable recording medium by using recording means;

determining whether or not the series of image-content data items recorded onto the at least one recording medium, at the recording step, includes the still-image data which includes data for which reproduction is inhibited for a reproduction device because that reproduction device does not support a format for such data; and making a notification indicating a number of the at least one recording medium onto which the series of image-content data items are recorded and a location of the at least one recording medium onto which the still-image data is recorded when it is determined that the still-image data is included in the series of image-content data items, at the determination step.

8. An information-processing device, comprising:

a recording control unit configured to control a recording unit to record a plurality of types of content-data items to be recorded onto at least one predetermined recording medium in a first predetermined format;

a determination unit configured to determine whether or not the plurality of types of content-data items recorded onto the recording medium by the recording unit includes at least one content-data item for which reproduction is inhibited for a reproduction device because the reproduction device supports a second predetermined format; and a notification unit configured to make a notification according to a predetermined method when the determination unit determines that the content-data item for which reproduction is inhibited is included, the notification indicating details on the determination, wherein the recording control unit controls the recording unit to write information about a notification indicating that the content-data item for which reproduction is inhibited is included onto the recording medium when recording the content-data item for which reproduction is inhibited for the reproduction device onto the recording medium, and when the plurality of types of content-data items are distributed and recorded onto a plurality of the recording mediums, the notification unit makes a notification which allows for differentiating between the recording medium including the content-data item for which reproduction is inhibited for the reproduction device and the recording medium including the content-data item that can be reproduced by the reproduction device.

9. An information-processing device, comprising:

a recording unit configured to record a series of image-content data items including video data and/or still-image data onto at least one predetermined removable recording medium;

a determination unit configured to determine whether or not the series of image-content data items recorded onto the at least one recording medium by the recording unit includes the still-image data which includes data for which reproduction is inhibited for a reproduction device because that reproduction device does not support a format for such data; and a notification unit configured to make a notification indicating a number of the at least one recording medium onto which the series of image-content data items are recorded and a location of the at least one recording medium onto which the still-image data is recorded when the determination unit determines that the still-image data is included in the series of image-content data items.

10. A content-reproduction-propriety-determination-notification method, comprising:

using a processor to carry out the following:

recording a plurality of types of content-data items to be recorded onto at least one predetermined recording medium in a first predetermined format by using recording means, making a reproduction-propriety-determination by determining whether or not the plurality of types of content-data items recorded onto the recording medium, at the recording step, includes at least one content-data item for which reproduction is inhibited for a reproduction device because the reproduction device supports a second predetermined format, and making a notification according to a predetermined method when it is determined that the content-data item for which reproduction is inhibited is included, at the reproduction-propriety-determination step, the notification indicating details on the determination, wherein at the recording step, information about a notification indicating that the content-data item for which reproduction is inhibited is written onto the recording medium when the content-data item for which reproduction is inhibited for the reproduction device is recorded onto the recording medium, and after the plurality of types of content-data items are recorded onto the at least one recording medium, the notification step specifies the recording medium including the content-data item of which reproduction is inhibited for the reproduction device and displays information about the recording medium including the content-data item of which reproduction is inhibited for the reproduction device, as the predetermined method.

11. A processor encoded with instructions for carrying out a content-reproduction-propriety-determination-notification method, the method comprising:

recording a plurality of types of content-data items to be recorded onto at least one predetermined recording medium in a first predetermined format by using recording means;

making a reproduction-propriety determination by determining whether or not the plurality of types of content-data items recorded onto the recording medium, at the recording step, includes at least one content-data item of which reproduction is inhibited for a reproduction device because the reproduction device supports a second predetermined format; and making a notification according to a predetermined method when it is determined that the content-data item for which reproduction is inhibited is included, at the reproduction-propriety-determination step, the notification indicating details on the determination, wherein at the recording step, information about a notification indicating that the content-data item for which reproduction is inhibited is included is written onto the recording medium when the content-data item for which reproduction is inhibited for the reproduction device is recorded onto the recording medium, and after the plurality of types of content-data items are recorded onto the at least one recording medium, the notification step specifies the recording medium including the content-data item for which reproduction is inhibited for the reproduction device and displays information about the recording medium including the content-data item for which reproduction is inhibited for the reproduction device, as the predetermined method.

12. An information-processing device, comprising:

a recording control unit configured to control a recording unit to record a plurality of types of content-data items to be recorded onto at least one predetermined recording medium in a first predetermined format;

a determination unit configured to determine whether or not the plurality of types of content-data items recorded onto the recording medium by the recording unit includes at least one content-data item for which reproduction is inhibited for a reproduction device because the reproduction device supports a second predetermined format; and a notification unit configured to make a notification according to a predetermined method when the determination unit determines that the content-data item for which reproduction is inhibited is included, the notification indicating details on the determination, wherein the recording control unit controls the recording unit to write information about a notification indicating that the content-data item for which reproduction is inhibited is included onto the recording medium when recording the content-data item for which reproduction is inhibited for the reproduction device onto the recording medium, and after the plurality of types of content-data items are recorded onto the at least one recording medium, the notification means specifies the recording medium including the content-data item for which reproduction is inhibited for the reproduction device and displays information about the recording medium including the content-data item for which reproduction is inhibited for the reproduction device, as the predetermined method.

* * * * *